June 26, 1951 — H. F. UNGER — 2,558,695
PIPE COUPLING
Filed July 25, 1950
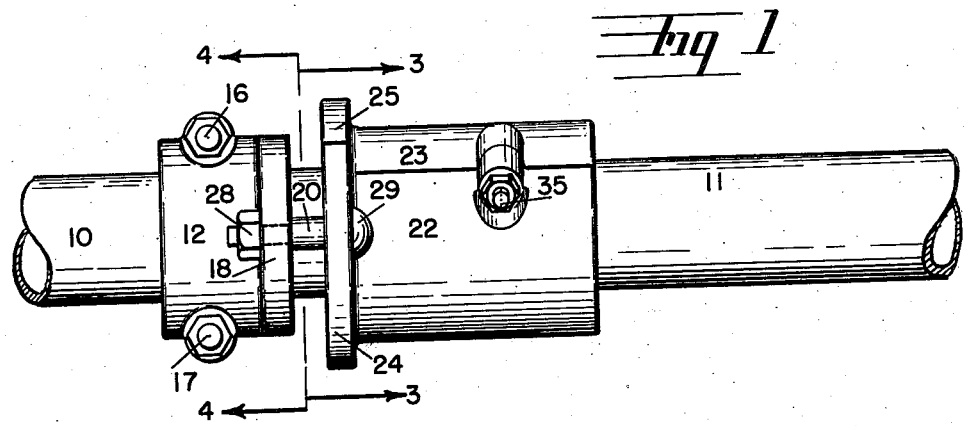
Fig. 1
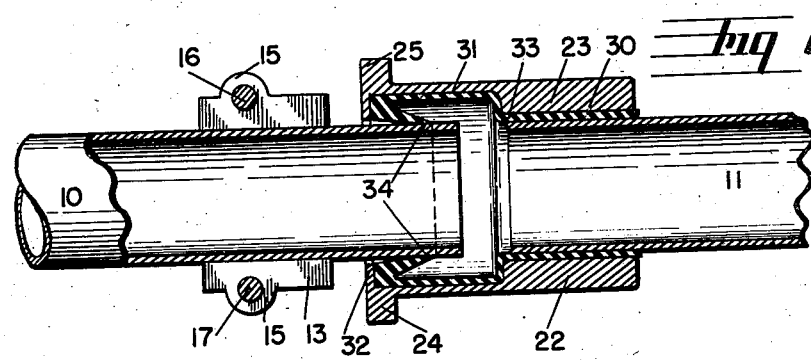
Fig. 2
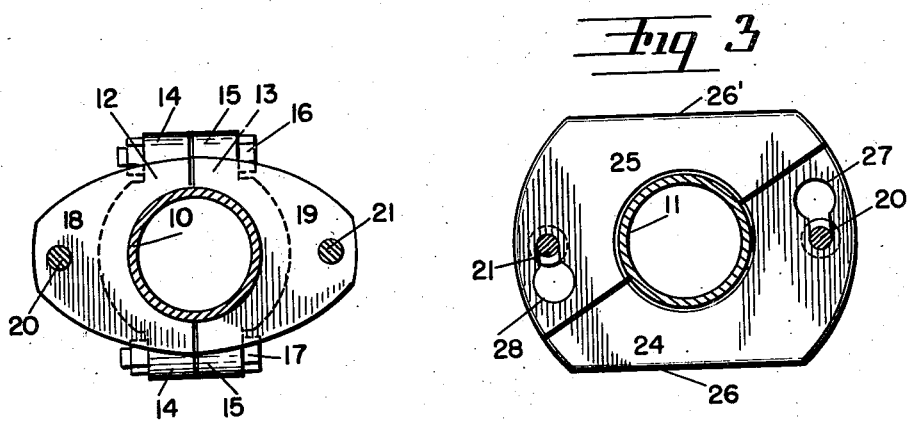
Fig. 3
Fig. 4
INVENTOR.
HECTOR F. UNGER, DECEASED
BY DELORES J. UNGER, EXECUTRIX
BY
ATTORNEY Patented June 26, 1951

2,558,695

UNITED STATES PATENT OFFICE 2,558,695

PIPE COUPLING

Hector F. Unger, deceased, late of Portland, Oreg., by Delores J. Unger, executrix, Portland, Oreg.

Application July 25, 1950, Serial No. 175,708

6 Claims. (Cl. 285—137)

This invention relates to couplings for pipes in pipe lines through which fluid under pressure is to be conveyed, and relates particularly to couplings for pipes in surface pipe lines employed in irrigation.

An object of the invention is to provide a simplified coupling which may be readily installed on any pipes of similar diameter.

Another object of the invention is to provide a coupling by means of which two pipe sections of the same diameter can easily be coupled and uncoupled, as desired.

While several different types of couplings have been developed for surface irrigation pipe lines, some of these require one of the coupled pipe ends to be of enlarged diameter so as to constitute a bell member in a bell and spigot combination. Other couplings require one or both of the pipe ends to be threaded in order that the coupling elements may be screwed on to the pipes. A particular object of the present invention is to provide a coupling adapted for use with unthreaded pipe ends of the same diameter and consequently capable of use with any ordinary pair of pipes.

An additional object is to provide a coupling composed of individual elements or sections which can easily be secured on the pipe ends to be coupled and which can then easily be removed from the pipes when the pipes are discarded or removed for any reason.

The manner in which these objects and incidental advantages are attained with this invention will be understood from the following brief description in which reference is to be made to the accompanying drawings.

In the drawings:

Fig. 1 is an elevation of the coupling illustrating two pipe sections in coupled relationship;

Fig. 2 shows the same coupling in vertical medial longitudinal section;

Fig. 3 is a transverse vertical section taken on line 3—3 of Fig. 1 looking in the direction of the corresponding arrows and thus to the right in Fig. 1; and Fig. 4 is a vertical section on the same line looking in the opposite direction and thus in the direction indicated by the arrows 4—4.

In the drawings the two pipe sections which are coupled are denoted by the reference characters 10 and 11. As apparent from Fig. 2, the two pipe sections 10 and 11 are of the same diameter, neither of the pipes is threaded, and neither pipe end is enlarged. Thus the pipe sections 10 and 11 may be said to represent any pair of ordinary pipes of the same, or approximately the same, external diameter.

One-half of the coupling assembly is secured to each pipe. The half of the coupling assembly secured to the pipe 10 consists of two identical sections 12 and 13, each having a semi-cylindrical main body portion, the interior wall of which is approximately of the same diameter as the exterior surface of the pipe 10. Identical flanges 18 and 19 extend laterally from the sections 12 and 13 respectively. These flanges 18 and 19 are elongated in diametrically opposite directions, as shown in Fig. 4. The sections 12 and 13 are formed with corresponding pairs of bosses to accommodate transversely extending clamping bolts. Thus the section 12 is formed with the bosses 14 (Fig. 4) and the section 13 is formed with the corresponding bosses 15 adapted to register with the bosses 14 respectively. When the pairs of bosses are brought into registration the clamping bolts 16 and 17 can be inserted through the bosses and the two sections clamped firmly on the pipe 10. In installing the coupler these sections 12 and 13 are clamped on the pipe 10 a short distance from the end of the pipe as shown in Figs. 1 and 2.

A pair of coupling-locking bolts 20 and 21 are mounted in the flanges 18 and 19 respectively. These bolts are preferably positioned at the widest portion of the flanges 18 and 19 and thus are diametrically opposite each other, and the bolts are parallel to, and extend in the same plane with, the axis of the pipe 10 when the sections 12 and 13 are clamped in position on the pipe 10.

The coupling-locking bolts 20 and 21 are identical. Each bolts has a reduced end portion which extends through the hole provided in the flange in which the bolt is mounted. Thus each bolt has a shoulder which engages one face of the flange while the reduced end extends beyond the other face of the flange, this latter end being threaded to accommodate a nut, such as the nut 28 shown in Fig. 1. The tightening of the nut results in the securing of the bolt rigidly in place in the flange. Each locking bolt has an enlarged head at the opposite end, such as the head 29 shown in Fig. 1, which is thus held in spaced relationship with respect to the inner or forward face of the flange in which the particular bolt is mounted.

The other half of the coupling assembly, which is secured to the other pipe 11, also consists of two identical sections 22 and 23 which, however, differ somewhat from the sections 12 and 13 both in size and shape. Identical flanges 24 and 25 extend laterally from the sections 22 and 23 respectively. The shape of these flanges is shown in Fig. 3. Preferably each of these flanges 24 and 25 has a flat edge, thus the edges 26 and 26', which will normally be horizontal, enabling one of these edges, such as the edge 26 of the flange 24, as shown in Fig. 3, to serve as the ground rest for this portion of the coupling and thus prevent inadvertent rolling on the ground of the pipe to which this half of the coupling assembly is attached.

Holes 27 and 28 (Fig. 3) extend through the flanges 24 and 25 respectively, which holes are of sufficient diameter to enable the heads of the coupling-locking bolts 20 and 21 to pass through the holes 27 and 28. A slot adjoins each of the holes 27 and 28, the width of each slot being slightly greater than the diameter of the main shank of the coupling-locking bolts, but being less than the diameter of the heads of the bolts. The purpose of these slotted holes, as apparent from Fig. 3, is to enable the flanges 24 and 25, and therewith the half of the coupling assembly composed of the two sections 22 and 23, to be brought into locking engagement with the bolts 20 and 21 mounted in the other half of the coupling assembly and composed of the sections 12 and 13 as described.

The two sections 22 and 23 (Fig. 1) are designed to be clamped together around a pipe by means of clamping bolts in the same manner as the sections 12 and 13 previously described. Thus the two sections 22 and 23 are provided with pairs of external bosses to accommodate transversely-positioned clamping bolts, one of these bolts 35 is shown in Fig. 1.

Each of the sections 22 and 23 (Figs. 1 and 2), instead of being formed with an interior semicylindrical surface of a constant diameter throughout, has a main interior diameter portion 30 (Fig. 2) with a diameter slightly greater than the external diameter of the pipe 11 on which the sections are to be clamped, a second or enlarged interior diameter portion 31, and an end wall 32 at the termination of the enlarged diameter portion 31. The end wall 32 has an inner periphery, the diameter of which is slightly greater than the exterior diameter of the pipes being coupled, as shown in Fig. 2. Thus the enlarged interior diameter portions 31 of the two sections 22 and 23, when these sections are clamped together, form an interior annular chamber.

The half of the coupling assembly composed of sections 22 and 23 is placed about a combined packing gland and gasket member 33 (Fig. 2) made of rubber or other material having similar flexible resilient properties. This packing gland-gasket member 33 has a tubular portion of approximately the same diameter as the outer surface of the pipe 11, which portion is adapted to be slipped over the pipe 11, and also has an enlarged diameter portion adapted to form a lining for the enlarged interior diameter portions 31 of the two sections 22 and 23 when these sections of the coupling assembly are clamped together. The packing gland-gasket member 33 terminates in an annular, inwardly-turned, tapered lip 34, the tip of which is of reduced diameter as well as of reduced thickness.

When the half of the coupling assembly which includes the two sections 22 and 23 is to be secured to the pipe 11, the packing gland-gasket member 33 is first slid on the end of the pipe 11 so that the smaller diameter portion of the resilient member 33 will extend over the end of the pipe, as shown in Fig. 2. Then the two sections 22 and 23 are secured about the member 33 and clamped in position on the pipe 11 by clamping bolts, as previously mentioned. The resilient packing gland-gasket member 33 not only acts as a lining for the entire half of the coupling assembly formed by the sections 22 and 23 but also provides a sealing or packing gland between the pipe 11 and this half of the coupling assembly.

When the half of the coupling assembly, comprising the sections 12 and 13, with their flanges 18 and 19 and the coupling-locking bolts 20 and 21 is clamped on the pipe 10 in the location indicated in Figs. 1 and 2, and the other half of the coupling assembly, comprising the sections 22 and 23, with their flanges 24 and 25, and the underlying packing gland-gasket member, is clamped on the end of pipe 11, the two pipes are then brought into coupling relationship by inserting the end of the pipe 10 into the end chamber beyond the gasket lip 34 and at the same time inserting the heads of the two coupling locking bolts 20 and 21 through the holes 27 and 28 in the flanges 24 and 25, thus bringing the two pipes 10 and 11 substantially into the relative position shown in Fig. 2. Finally a slight rotation of the inserted pipe 10, causing the shank portions of the locking bolts 20 and 21 to enter the slots joining the holes 27 and 28, will lock the two coupled pipes against separation by any longitudinal pull. When the pipes are thus coupled and locked together and the water is turned on in the pipe, the internal pressure will cause the sealing lip 34 of the packing gland-gasket member 33 to be held firmly in sealing position with respect to the pipe 10, and the packing gland-gasket member 33 will also prevent any water from escaping through the surrounding coupling section or leaking through these sections and the outer surface of the pipe 11.

Although a leak-proof coupling is thus provided, a limited amount of flexibility of the pipes with respect to each other is also permitted since the inside perimeter of the end wall 32 is of larger diameter than the exterior surface of pipe 10 and since the coupling-locking bolts 20 and 21 are not rigidly held in the slots of the holes 27 and 28.

The unlocking of the coupling is of course very easily accomplished. A slight movement of the pipes towards each other with a slight rotation of the pipe 10 with respect to the pipe 11, so as to bring the coupling-locking bolts 20 and 21 out of the slots and into the holes 27 and 28, will enable the pipes to be moved apart longitudinally.

Finally either half of the coupling assembly may be removed from the pipe on which it is mounted by loosening the corresponding clamping bolts, thus enabling the coupling assemblies to be transferred to any other pipes of the same size when desired.

What is claimed is:

1. In a coupling assembly for a pair of pipes having ends to be coupled of approximately the same size, a plurality of sections clamped together on one of said pipes and constituting one half of said coupling assembly, a plurality of sections clamped together on the other of said pipes and constituting the other half of said coupling assembly, said latter mentioned sections having an interior wall surface one portion of which is of approximately the same diameter as the exterior diameter of said latter mentioned pipe and another portion of which is of larger diameter, a combined packing gland and gasket member extending over said interior wall surfaces of said latter mentioned sections and between the outer face of said latter mentioned pipe and said latter mentioned sections, said member terminating in an annular sealing lip within said larger diameter portion of said latter mentioned sections adapted to form a pressure seal with the outer surface of said first mentioned pipe when said first mentioned pipe is inserted in said other half of said coupling assembly, elements mounted in the sections of one half of said coupling assembly, and engaging means for said elements in the sections of said other half of said coupling assembly.

2. In a pipe coupling assembly of the character described, a plurality of sections clamped together on one of the pipes and constituting one half of said coupling assembly, flanges extending laterally from said sections, a plurality of sections clamped together on the other of said pipes and constituting the other half of said coupling assembly, said latter mentioned sections having an interior wall surface one portion of which is of approximately the same diameter as the exterior diameter of said latter mentioned pipe and another portion of which is of larger diameter, flanges extending from said latter mentioned sections, a combined packing gland and gasket member extending over said interior wall surfaces of said latter mentioned sections and between the outer face of said latter mentioned pipe and said latter mentioned sections, said member terminating in an annular tapered sealing lip within said larger diameter portion of said latter mentioned sections adapted to form a pressure seal with the outer surface of said first mentioned pipe when said first mentioned pipe is inserted in said other half of said coupling assembly, elements mounted in the flanges of the sections of one half of said coupling assembly, and engaging means for said elements in the flanges of the sections of said other half of said coupling assembly.

3. In a coupling assembly for a pair of pipes having ends to be coupled of approximately the same size, a pair of identical sections clamped together on one of said pipes and constituting one half of said coupling assembly, coupling-locking bolts mounted in said sections and extending forwardly from said sections substantially parallel to the axis of said latter mentioned pipe, a pair of identical sections clamped together on the other of said pipes and constituting the other half of said coupling assembly, said latter mentioned pair of sections having an interior wall surface one portion of which is of approximately the same diameter as the exterior diameter of said latter mentioned pipe and another portion of which is of larger diameter, flanges extending from said latter mentioned pair of sections, engaging means in said latter mentioned flanges for engaging said coupling-locking bolts respectively, and a combined packing gland and gasket member extending over said interior wall surfaces of said latter mentioned pair of sections and between the outer face of said latter mentioned pipe and said latter mentioned sections, said member terminating in an annular sealing lip within said larger diameter portion of said latter mentioned pair of sections adapted to form a pressure seal with the outer surface of said first mentioned pipe when said first mentioned pipe is inserted in said other half of said coupling assembly.

4. In a pipe coupling assembly of the character described, a pair of identical sections clamped together on one of the pipes and constituting one half of said coupling assembly, identical flanges extending laterally from said sections, coupling-locking bolts mounted in said flanges and extending forwardly from said flanges, a pair of identical sections clamped together on the other of said pipes and constituting the other half of said coupling assembly, said latter mentioned pair of sections having an interior wall surface one portion of which is of approximately the same diameter as the exterior diameter of said latter mentioned pipe and another portion of which is of larger diameter, identical flanges extending from said latter mentioned pair of sections, engaging means in said latter mentioned flanges for engaging said coupling-locking bolts respectively, and a combined packing gland and gasket member extending over said interior wall surfaces of said latter mentioned pair of sections and between the outer face of said latter mentioned pipe and said latter mentioned sections, said member terminating in an annular tapered sealing lip within said larger diameter portion of said latter mentioned pair of sections adapted to form a pressure seal with the outer surface of said first mentioned pipe when said first mentioned pipe is inserted in said other half of said coupling assembly.

5. A coupling assembly for a pair of pipes having ends to be coupled of approximately the same size including a pair of sections clamped together on one of said pipes and constituting one half of said coupling assembly, flanges extending laterally from said sections, a pair of sections clamped together on the other of said pipes and constituting the other half of said coupling assembly, said latter mentioned pair of sections having an interior wall surface one portion of which is of approximately the same diameter as the exterior diameter of said latter mentioned pipe and another portion of which is of larger diameter, flanges extending from said latter mentioned pair of sections, a combined packing gland and gasket member extending over said interior wall surfaces of said latter mentioned pair of sections and between the outer face of said latter mentioned pipe and said latter mentioned sections, said member terminating in an annular sealing lip within said larger diameter portion of said latter mentioned pair of sections adapted to form a pressure seal with the outer surface of said first mentioned pipe when said first mentioned pipe is inserted in said other half of said coupling assembly, coupling-locking bolts mounted in the flanges of one of said pair of sections, and engaging means for said coupling-locking bolts in the flanges of said other pair of sections.

6. A pipe coupling assembly of the character described comprising a pair of identical sections clamped together on one of the pipes and constituting one half of said coupling assembly, identical flanges extending laterally from said sections, coupling-locking bolts mounted in said flanges and extending forwardly from said flanges substantially parallel to the axis of said latter mentioned pipe, a pair of identical sections clamped together on the other of said pipes and constituting the other half of said coupling assembly, said latter mentioned pair of sections having an interior wall surface one portion of which is of approximately the same diameter as the exterior diameter of said latter mentioned pipe and another portion of which is of larger diameter and having an annular, inwardly-extending end wall beyond said larger diameter portion, identical flanges extending from said latter mentioned pair of sections, engaging means in said latter mentioned flanges for engaging said coupling-locking bolts respectively, and a combined packing gland and gasket member extending over said interior wall surfaces of said latter mentioned pair of sections and between the outer face of said latter mentioned pipe and said latter mentioned sections, said member terminating in an annular tapered sealing lip inside of said end wall within said larger diameter portion of said latter mentioned pair of sections adapted to form a pressure seal with the outer surface of said first mentioned pipe when said first mentioned pipe is inserted in said other half of said coupling assembly.

DELORES J. UNGER,
*Executrix of Estate of Hector F. Unger, Deceased.*

No references cited.